US008918458B2

(12) United States Patent  (10) Patent No.: US 8,918,458 B2
Lyle et al.  (45) Date of Patent: Dec. 23, 2014

(54) UTILIZING GROUP STATISTICS FOR GROUPS OF PARTICIPANTS IN A HUMAN-TO-HUMAN COLLABORATIVE TOOL

(75) Inventors: Ruthie D. Lyle, Durham, NC (US); Arthur R. Francis, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1611 days.

(21) Appl. No.: 11/110,231

(22) Filed: Apr. 20, 2005

(65) Prior Publication Data

US 2006/0242233 A1    Oct. 26, 2006

(51) Int. Cl.
*G06F 15/16* (2006.01)
*G06Q 10/10* (2012.01)

(52) U.S. Cl.
CPC ..................... *G06Q 10/10* (2013.01)
USPC .......................... 709/204; 709/205

(58) Field of Classification Search
CPC ..................... H04L 29/06401; H04L 65/4015; H04L 65/4007
USPC .................... 709/204, 205, 206; 715/700–866
See application file for complete search history.

(56) References Cited

U.S. PATENT DOCUMENTS

| 6,269,394 B1* | 7/2001 | Kenner et al. | 709/217 |
|---|---|---|---|
| 6,598,074 B1* | 7/2003 | Moller et al. | 709/204 |
| 6,665,715 B1 | 12/2003 | Houri | |
| 7,360,164 B2* | 4/2008 | Bjoernsen et al. | 715/751 |
| 7,877,443 B2* | 1/2011 | Lyle et al. | 709/204 |
| 7,945,619 B1* | 5/2011 | Chawla et al. | 709/204 |
| 2002/0059418 A1 | 5/2002 | Bird et al. | |
| 2003/0037103 A1* | 2/2003 | Salmi et al. | 709/203 |
| 2003/0060678 A1* | 3/2003 | Watai et al. | 600/109 |
| 2003/0065729 A1* | 4/2003 | Leinonen | 709/206 |
| 2003/0167324 A1* | 9/2003 | Farnham et al. | 709/224 |
| 2004/0054773 A1* | 3/2004 | Funke-Schaeff et al. | 709/224 |
| 2004/0172481 A1* | 9/2004 | Engstrom | 709/239 |
| 2004/0174392 A1* | 9/2004 | Bjoernsen et al. | 345/751 |
| 2004/0193691 A1 | 9/2004 | Chang | |
| 2004/0201668 A1* | 10/2004 | Matsubara et al. | 348/14.05 |
| 2005/0177613 A1* | 8/2005 | Dresden | 709/200 |
| 2005/0198131 A1* | 9/2005 | Appelman et al. | 709/204 |
| 2006/0009243 A1* | 1/2006 | Dahan et al. | 455/466 |
| 2006/0026253 A1* | 2/2006 | Kessen et al. | 709/207 |
| 2006/0080614 A1* | 4/2006 | Lentz | 715/753 |

OTHER PUBLICATIONS

*SNMPc from Castle Rock Computing*; Advanced Network Mapping, Nov. 2, 2004.

* cited by examiner

*Primary Examiner* — Jimmy H Tran
(74) *Attorney, Agent, or Firm* — Steven M. Greenberg, Esq.; CRGO Law

(57) ABSTRACT

A method, system and apparatus for utilizing statistics in a human-to-human collaborative tool is provided. A method for utilizing group statistics for a group participating in a collaborative session can include collecting group statistics including a percentage of the participants in the set having a particular availability status for a grouped set of participants designated to participate in a collaborative session provided by a human-to-human collaborative tool executing in a computer system, generating a display of the percentage of the participants in the set having the particular availability status, and rendering the generated display of the percentage of the participants in the set having the particular availability status in a user interface in association with a hierarchical listing of participants in the collaborative session.

17 Claims, 3 Drawing Sheets

UTILIZING GROUP STATISTICS FOR GROUPS OF PARTICIPANTS IN A HUMAN-TO-HUMAN COLLABORATIVE TOOL

BACKGROUND OF THE INVENTION

1. Statement of the Technical Field

The present invention relates to the field of collaborative computing and more particularly to collaborator presence in a human-to-human collaborative tool.

2. Description of the Related Art

Real time communications systems provide a substantial enhancement over more traditional, asynchronous communications systems. Electronic mail delivery systems, the prototypical asynchronous communications systems, in its time represented a giant leap forward in respect to global interpersonal communications. Prior to electronic mail, individuals primarily communicated via telephone, facsimile and post. With electronic mail, however, individuals expect near instant delivery of text, and even imagery, audio and video, without incurring the delay typical of the postal system, or the expense associated with telephony and fax technologies.

Despite the ubiquity of electronic mail, asynchronous communications systems lack several elements common in the realm of real time communications systems. In particular, the seemingly instant delivery of a message cannot be experienced in the world of electronic mail. In a real-time society, the minor latencies associated with electronic mail often cannot be suitable for the task at hand where a real-time conversation will be required in addressing a problem or performing a collaborative task. More importantly, often the feel and nature of a "conversation" as it is known to human beings only can be approximated through real time communications where the participants to a conversation feel the spontaneity of an exchange of ideas, much as is the case in a live, face-to-face conversation.

The recent rapid development of the Internet has led to advanced modes of synchronous, real-time collaboration able to fulfill the real-time communicative requirements of the modern computing participant. Using the Internet as a backbone, individuals worldwide can converge in real-time in cyberspace to share ideas, documents and images in a manner not previously possible through conventional telephony and video conferencing. To facilitate collaboration over the Internet, a substantial collection of technologies and protocols have been assembled to effectively deliver audio, video and data over the single data communications medium of the Internet. These technologies include several human-to-human collaborative tools such as instant messaging and persistent chat rooms.

In a human-to-human collaborative tool such as an instant messenger, presence sensing can indicate to a user whether other collaborators are available to participate in a collaborative session. Possible states can include online and available, online but unavailable, and offline, to name a few. Generally, establishing a collaborative session involving other designated participants, a listing of the other designated participants can be provided which listing can indicate the state of each of the participants.

Advanced forms of human-to-human collaborative tools further permit the designation of groups of participants in a collaborative session. The groups of participants can range from just a few locally disposed participants, to hundreds of participants dispersed about an expansive geography. Yet, while presence sensing can provide state information for the individual participants, state information for the groups remains unavailable. Moreover, helpful granular information regarding the groups also remains unavailable to the moderator of a human-to-human collaborative session.

SUMMARY OF THE INVENTION

The present invention addresses the deficiencies of the art in respect to presence sensing in a collaborative environment and provides a novel and non-obvious method and apparatus for utilizing statistics in a human-to-human collaborative tool. A method for utilizing group statistics for a group participating in a collaborative session can include collecting group statistics for a grouped set of participants designated to participate in a collaborative session and rendering the group statistics in a user interface in association with a hierarchical listing of participants in the collaborative session. The group statistics can include, for example, a distribution of status data for the participants in the group, a distribution of time zones for the participants in the group, and a distribution of geographical locations for the participants in the group.

The rendering step can include detecting a selection of the group in a hierarchical listing of participants in the collaborative session and, responsive to the detection, rendering the group statistics in a user interface in association with the hierarchical listing of participants in the collaborative session. The rendering step further can include detecting a selection of a statistic in the user interface and, responsive to the detection, rendering an additional user interface having a sub-set of statistics associated with the selected statistic.

A system for utilizing group statistics for a group participating in a collaborative session can include a collaborative tool, presence detection logic coupled to the collaborative tool, and statistics processing logic coupled to the presence detection logic. The collaborative tool can include an instant messenger, for example. Notably, the statistics processing logic can include logic programmed to collect group statistics for a grouped set of participants designated to participate in a collaborative session accessed through the collaborative tool and to render the group statistics in a user interface in association with a hierarchical listing of participants in the collaborative session.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for utilizing group statistics for groups of participants in a human-to-human collaborative tool. In accordance with the present invention, statistics can be collected for participants in a group of participants designated to interact with a human-to-human collaborative tool. Specifically, the statistics can include granular information for the participants in the group including whether or not the participants are available to interact with the human-to-human collaborative tool. The statistics, in turn, can be presented for the group through a user interface to the human-to-human collaborative tool. In this way, granular information regarding groups can be made available to the moderator of a human-to-human collaborative session.

Figure 1:
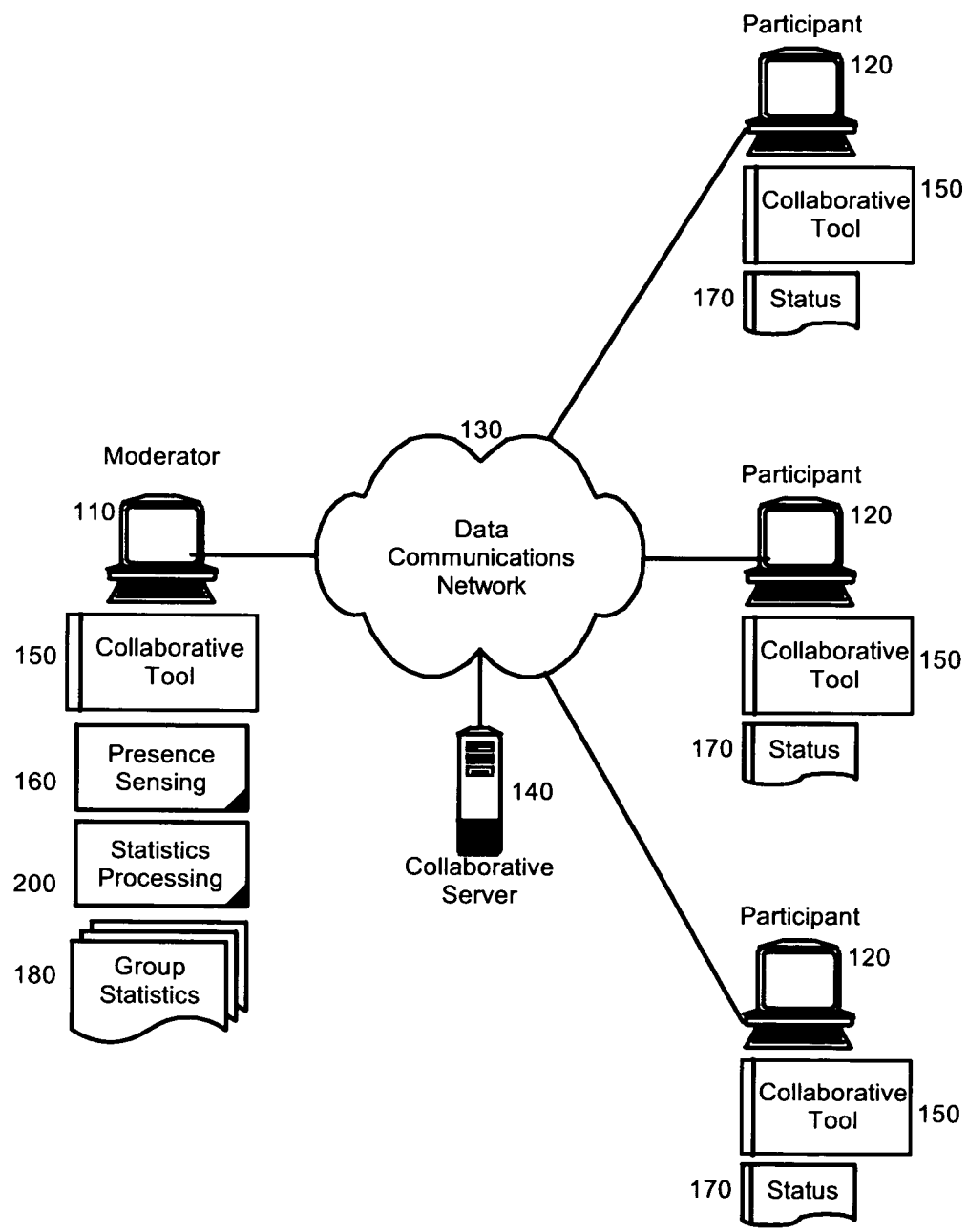
FIG. 1 is a schematic illustration of a system for utilizing group statistics for groups of participants in a human-to-human collaborative tool; and, FIG. 2 is a flow chart illustrating a process for utilizing group statistics for groups of participants in a human-to-human collaborative tool.; and, FIGS. 3A and 3B, taken together, are a pictorial illustration of a user interface supporting the utilization of group statistics for groups of participants in a human-to-human collaborative tool.

In further illustration, FIG. 1 is a schematic illustration of a system for utilizing group statistics for groups of participants in a human-to-human collaborative tool. The system can include a collaborative server 140 supporting a human-to-human collaborative session. The collaborative session can include designated participants 120 which participants 120 can interact with other participants 120 over the data communications network 130 through the operation of corresponding collaborative tools 150. The collaborative session further can include a moderator 110 which also can interact with the participants 120 through the operation of a corresponding collaborative tool 150. Notably, selected ones of the participants 120 can be arranged in a group (not shown).

In accordance with the present invention, presence sensing logic 160 can be coupled to the collaborative tool 150 for use by the moderator 110. The presence sensing logic 160 can detect the status 170 of participants 120 designated to participate in a human-to-human collaborative session. The status 170 can include, for example, AVAILABLE, AWAY, DO NOT DISTURB and OFFLINE to name only a few. The presence sensing logic 160 further can be coupled to statistic processing logic 200. The statistics processing logic 200 can collect group statistics 180 for the participants 120 in a group selected to participate in a human-to-human collaborative session. For example, the group statistics can include the percentage of selected participants 120 in the group having a specified status. Additionally, a user interface (not shown) can be rendered in the collaborative tool 150 which can present the collected group statistics 180.

Figure 2:
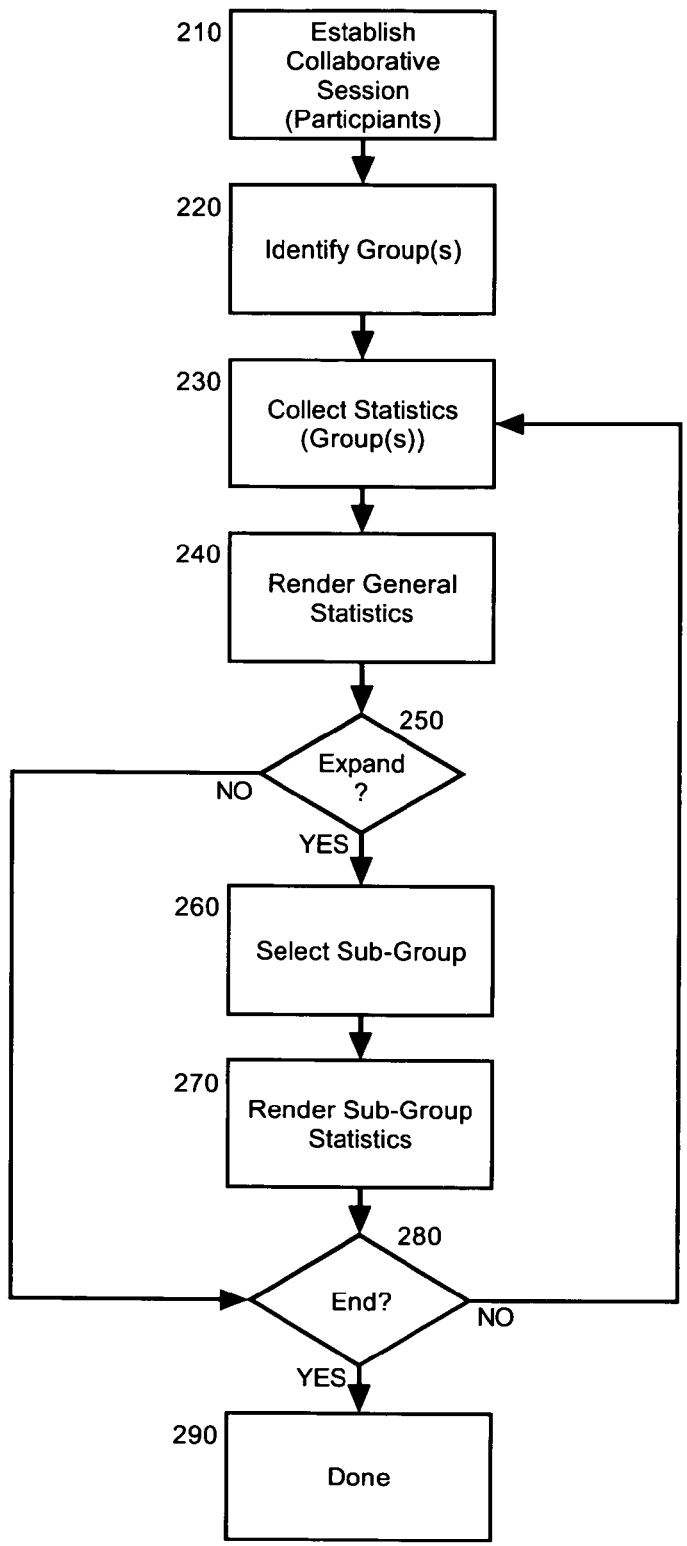

In more particular illustration, FIG. 2 is a flow chart illustrating a process for utilizing group statistics for groups of participants in a human-to-human collaborative tool. Beginning in block 210, a collaborative session can be established which can include one or more designated participants. In block 220, one or more groups of participants can be identified as having been designated as participants to the collaborative session. Subsequently, in block 230 statistics can be collected for the group. The statistics can include the status of each of the participants in the group and the percentage of participants in the group having a particular status.

In block 240, a user interface can be generated to include the general statistics for a selected group. In this regard, the user interface can be rendered in response to the selection of a group entry in a hierarchical list of participants to the collaborative session such as an entry for a group of participants in a buddy list. In decision block 250, it can be determined whether the user interface has received a request to further expand upon a selected statistic of the user interface. If so, in block 260 the selected sub-group of participants can be selected and in block 270, the statistics for the sub-group can be rendered in the user interface or in a new user interface. Examples can include a geographic distribution of participants where are AVAILABLE, or a listing of participants who are AVAILABLE in the group. In decision block 280, if the collaborative session remains active, the process can repeat through block 230. Otherwise the process can end in block 290.

Figure 3A:
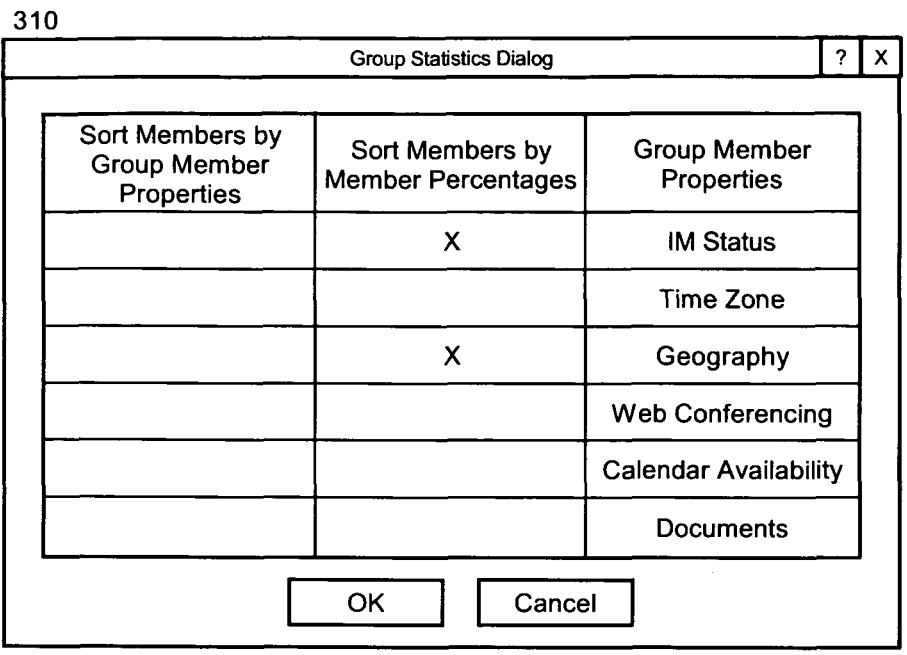
Figure 3B:
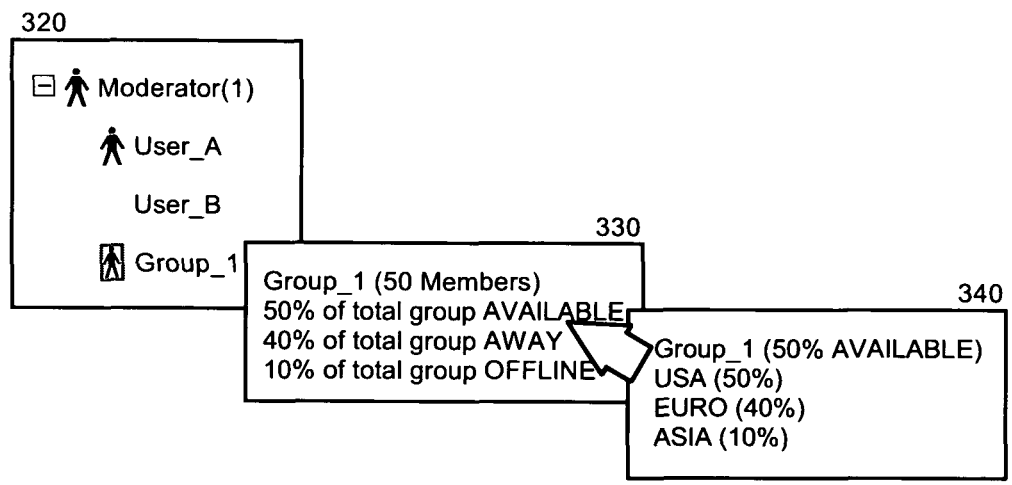

Turning now to FIGS. 3A and 3B, a pictorial illustration is shown of a configuration dialog box supporting the utilization of group statistics for groups of participants in a human-to-human collaborative tool. Referring first to FIG. 3A, a configuration dialog box 310 is shown which can be rendered in coordination with a collaborative tool. The configuration dialog box 310 can include a listing of a selection of statistics for a group of participants. The selection can include, for instance, the status of the participants in the group, the time zone of the individual participants, and the geographical location of the participants, to name a few.

Referring to FIG. 3B, a moderator for a collaborative session can activate a user interface 330 for displaying general group statistics by selecting a group in the hierarchical display 320 of participants in a collaborative session in order obtain more granular information regarding the group and the participants in the group. Optionally, additional statistics can be rendered in a user interface 340 for displaying more specific group statistics by selecting a particular entry in the user interface 330 for displaying general group statistics. In this way, the moderator can review granular data for the participants in a group participating in the collaborative session.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for utilizing group statistics for a group participating in a collaborative session, the method comprising the steps of:
   collecting group statistics for a grouped set of participants designated to participate in a collaborative session provided by a human-to-human collaborative tool executing in a computing system, the group statistics comprising a percentage of the participants in the grouped set of participants having a particular availability status, the grouped set of participants comprising selected ones of participants in the collaborative session;
   generating a display of the percentage of the participants in the grouped set of participants having the particular availability status; and,
   rendering said generated display of the percentage of the participants in the grouped set of participants having the particular availability status in a user interface in association with a hierarchical listing of participants in said collaborative session, the hierarchical listing of participants comprising both individual participants in said collaborative session and also the grouped set of participants in said collaborative session.

2. The method of claim 1, wherein said collecting group statistics further comprises the steps of:
   determining the particular availability status for each of said participants in said grouped set of participants; and,
   computing a distribution of availability status data for said participants in said grouped set of participants based upon the determined particular availability status for each of said participants in said grouped set of participants.

3. The method of claim 1, wherein said collecting group statistics further comprises the steps of:
   determining a time zone for each of said participants in said grouped set of participants; and,
   computing a distribution of time zones for said participants in said grouped set of participants.

4. The method of claim 1, wherein said collecting group statistics further comprises the steps of:
   determining a geographical location for each of said participants in said grouped set of participants; and,
   computing a distribution of geographical locations for said participants in said grouped set of participants.

5. The method of claim 1, wherein said rendering step comprises the steps of:
   detecting a selection of said grouped set of participants in the hierarchical listing of participants in said collaborative session; and,
   responsive to said detection, rendering said generated display of the percentage of the participants in the grouped set of participants having the particular availability status for the selected grouped set of participants in the user interface in association with said hierarchical listing of participants in said collaborative session.

6. The method of claim 1, wherein said rendering step further comprises the steps of:
   detecting a selection of one rendered said generated display of the percentage of the participants in the grouped set of participants having the particular availability status in said user interface; and,
   responsive to said detection, rendering an additional user interface having a sub-set of statistics associated with said selected particular availability status.

7. The method of claim 1, wherein the particular availability status is selected from the group consisting of available, away, do not disturb, and offline.

8. A system for utilizing group statistics for a group participating in a collaborative session, the system comprising:
   a collaborative tool stored in a memory executed by a processor of at least one computer system;
   presence detection logic executing in the memory of the at least one computer system coupled to said collaborative tool; and,
   statistics processing logic coupled to said presence detection logic, the statistics processing logic comprising program code enabled when executing in the memory of the at least one computer system to collect group statistics for a grouped set of participants designated to participate in a collaborative session provided by the collaborative tool, the group statistics comprising a percentage of the participants in the grouped set of participants having a particular availability status indicated by the presence detection logic, the grouped set of participants comprising selected ones of participants in the collaborative session, to generate a display of the percentage of the participants in the grouped set of participants having the particular availability status, and to render said generated display of the percentage of the participants in the grouped set of participants having the particular availability status in a user interface in association with a hierarchical listing of participants in said collaborative session, the hierarchical listing of participants comprising both individual participants in said collaborative session and also the grouped set of participants in said collaborative session.

9. The system of claim 8, wherein said collaborative tool comprises an instant messenger.

10. The system of claim 8, wherein the particular availability status is selected from the group consisting of available, away, do not disturb, and offline.

11. A computer program product comprising a non-transitory machine readable storage memory having stored thereon a computer program for utilizing group statistics for a group participating in a collaborative session, the computer program comprising a routine set of instructions which when executed by a machine causes the machine to perform the steps of:
   collecting group statistics for a grouped set of participants designated to participate in a collaborative session, the group statistics comprising a percentage of the participants in the grouped set of participants having a particular availability status, the grouped set of participants comprising selected ones of participants in the collaborative session;
   generating a display of the percentage of the participants in the grouped set of participants having the particular availability status; and,
   rendering said generated display of the percentage of the participants in the grouped set of participants having the particular availability status in a user interface in association with a hierarchical listing of participants in said collaborative session, the hierarchical listing of participants comprising both individual participants in said collaborative session and also the grouped set of participants in said collaborative session.

12. The computer program product of claim 11, wherein said collecting group statistics further comprises the steps of:
   determining the particular availability status for each of said participants in said grouped set of participants; and,
   computing a distribution of availability status data for said participants in said grouped set of participants based upon the determined particular availability status for each of said participants in said grouped set of participants.

13. The computer program product of claim 11, wherein said collecting group statistics further comprises the steps of:
   determining a time zone for each of said participants in said grouped set of participants; and,
   computing a distribution of time zones for said participants in said grouped set of participants.

14. The computer program product of claim 11, wherein said collecting group statistics further comprises the steps of:
   determining a geographical location for each of said participants in said grouped set of participants; and,
   computing a distribution of geographical locations for said participants in said grouped set of participants.

15. The computer program product of claim 11, wherein said rendering step comprises the steps of:
   detecting a selection of said grouped set of participants in the hierarchical listing of participants in said collaborative session; and,
   responsive to said detection, rendering said generated display of the percentage of the participants in the grouped set of participants having the particular availability status for the selected grouped set of participants in the user interface in association with said hierarchical listing of participants in said collaborative session.

16. The computer program product of claim 11, wherein said rendering step further comprises the steps of:
   detecting a selection of one rendered said generated display of the percentage of the participants in the grouped set of participants having the particular availability status in said user interface; and,
   responsive to said detection, rendering an additional user interface having a sub-set of statistics associated with said selected particular availability status.

17. The computer program product of claim 11, wherein the particular availability status is selected from the group consisting of available, away, do not disturb, and offline.

* * * * *